Sept. 30, 1958  C. O. SLEMMONS  2,854,246
TANDEM AXLE TRAILER VEHICLE
Filed Feb. 8, 1955  2 Sheets-Sheet 1
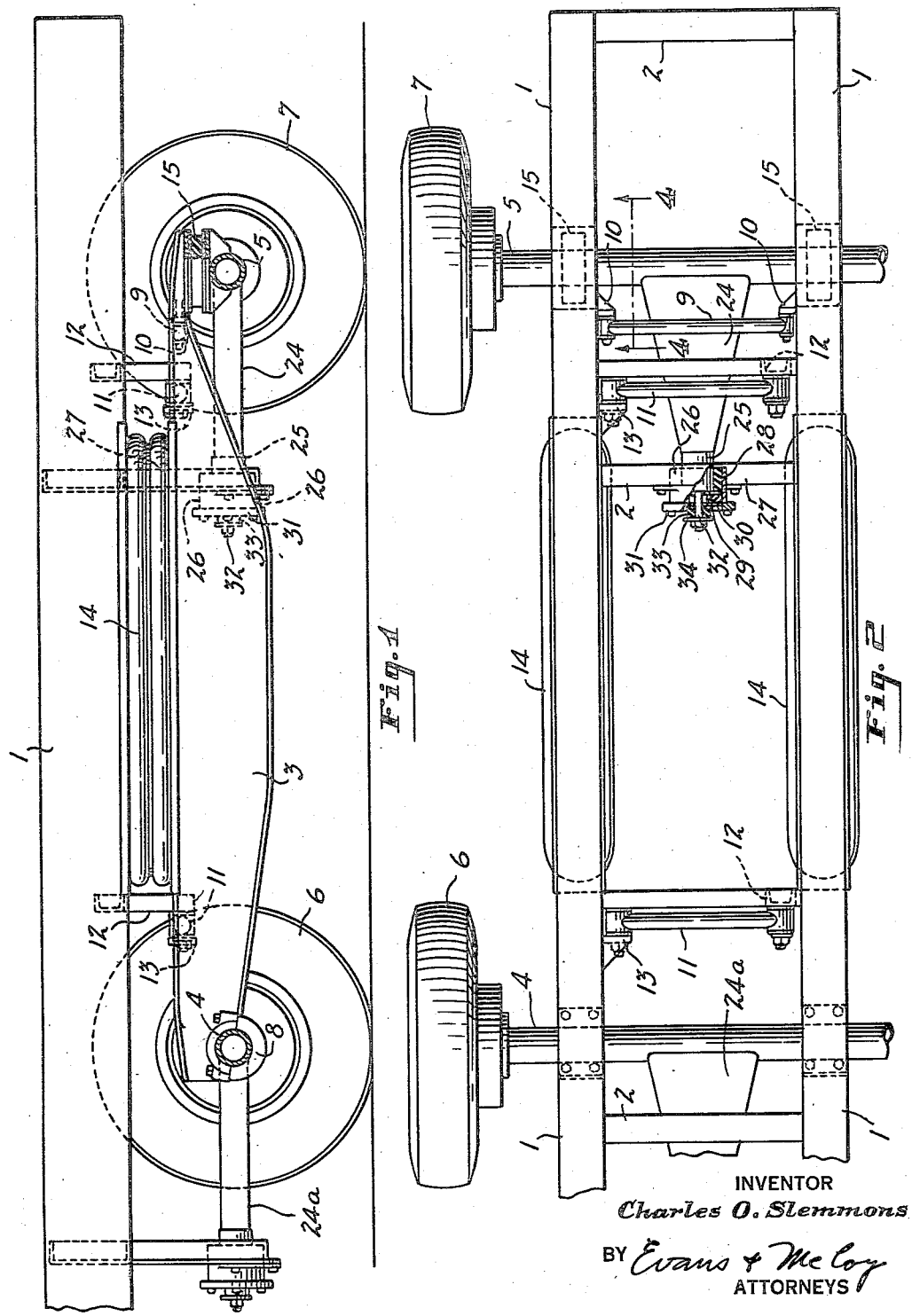
INVENTOR
Charles O. Slemmons
BY Evans & McCoy
ATTORNEYS

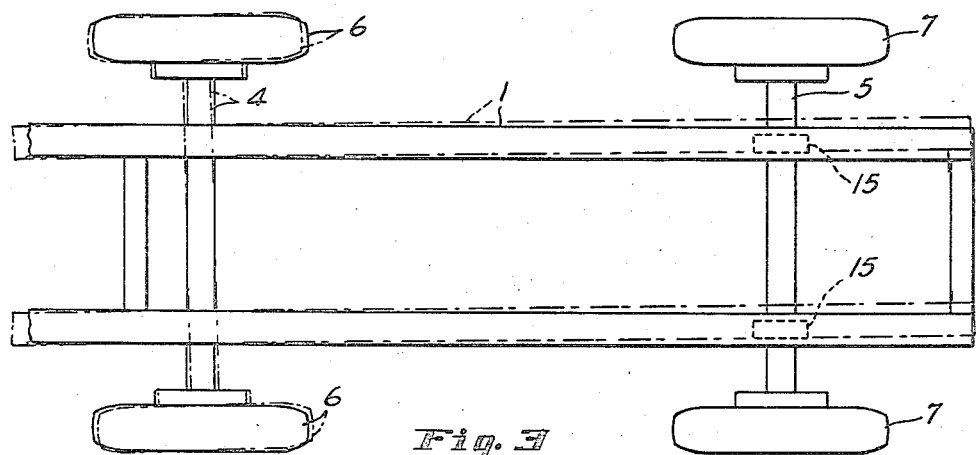
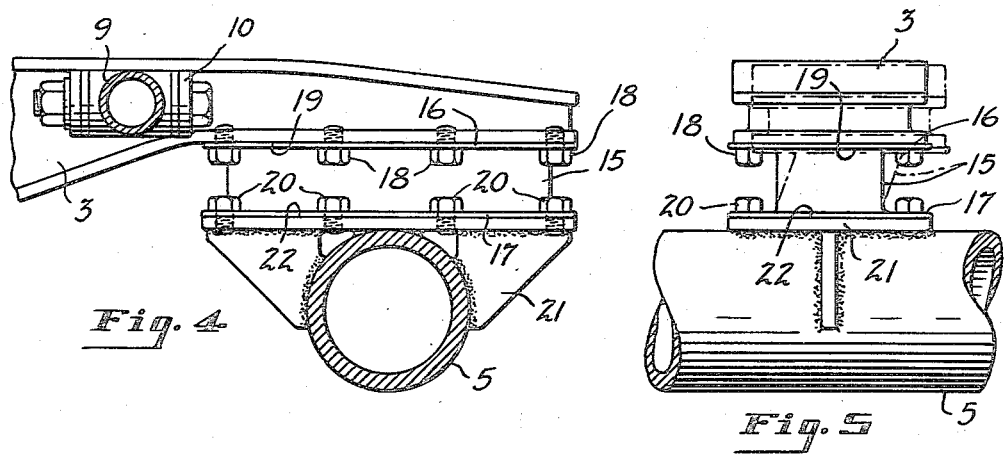
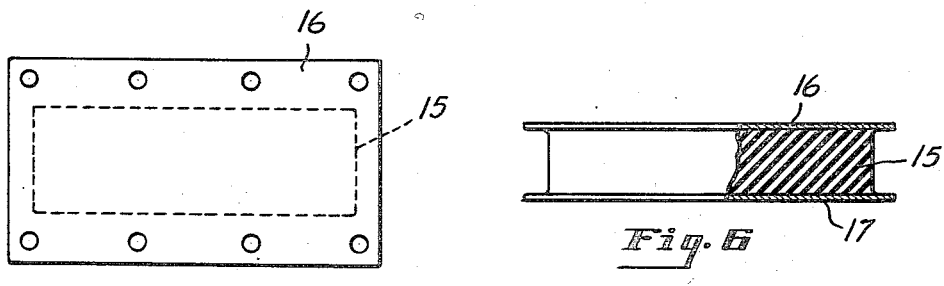

United States Patent Office 2,854,246
Patented Sept. 30, 1958

2,854,246

TANDEM AXLE TRAILER VEHICLE

Charles O. Slemmons, Akron, Ohio, assignor to The General Tire and Rubber Company, Akron, Ohio, a corporation of Ohio Application February 8, 1955, Serial No. 486,751

9 Claims. (Cl. 280—104.5)

This invention relates to trailer vehicles of the tandem axle type in which front and rear wheel carrying axles are part of a supporting truck upon which the trailer frame is yieldably supported, and more particularly to a trailer vehicle of the type referred to in which the rear axle is movable laterally relative to the truck and the vehicle frame to facilitate travel of the vehicle in a curved path.

The trailer vehicle of the present invention has an elongated wheeled supporting truck provided with side beams that extend longitudinally of the trailer frame and that are held against lateral angular movements with respect to the trailer frame, a front wheel carrying axle that is secured in a fixed position relative to the side beams and a rear axle that has connections to the side beams that include resilient cushioning elements that normally hold the rear axle parallel to the front axle with the wheels in alinement, that yieldably resist all movements of the rear axle with respect to the side beams but which have their greatest yieldability laterally of said beams, so that lateral shifting of the vehicle frame with respect to the rear axle in one direction or the other when the vehicle is passing around a curve due to lateral thrusts exerted on the wheels of the rear axle is permitted, the resilience of the cushioning elements being sufficient to return the rear axle to its normal position with respect to the side beams and vehicle frame when straight line travel is resumed.

Important objects of the invention are to reduce slippage of the trailer vehicle tires on the road surface in passing around curves, to lessen the tractive resistance of the trailer while rounding curves, to reduce the racking stresses to which the truck and vehicle frame are subjected in service, and to make practicable the use of supporting trucks having widely spaced wheel carrying axles.

Reference should be had to the accompanying drawings forming a part of this specification in which:

Figure 1 is a fragmentary side elevation showing a portion of the frame of a trailer vehicle and a tandem axle supporting truck;

Fig. 2 is a fragmentary plan view of the portion of the vehicle shown in Fig. 1, the load carrying body of the vehicle being omitted;

Fig. 3 is a diagrammatic plan view of the trailer vehicle frame and the supporting axles, showing the manner in which the vehicle frame is displaced with respect to the rear axle when the trailer is traveling in a curved path;

Fig. 4 is a vertical section on an enlarged scale taken on the line indicated at 4—4 in Fig. 2;

Fig. 5 is a fragmentary rear elevation showing one of the cushioning units between the rear axle and one of the truck side beams;

Fig. 6 is a side elevation of one of the rear axle cushioning units, a portion of the unit being broken away and shown in sections; and Fig. 7 is a plan view of the cushioning unit.

In the accompanying drawings a portion only of the frame of a trailer vehicle is shown, this frame comprising longitudinal side bars 1 and longitudinally spaced connecting cross bars 2. One supporting truck is shown, it being understood that a plurality of such trucks may be employed when desired.

The supporting truck has a pair of side beams 3 that are disposed in parallel relation between the frame bars 1 and that are supported at their front and rear ends on transverse axles 4 and 5 which carry supporting wheels 6 and 7. The front axle 4 is secured in fixed position with respect to the side beams 3 by means of suitable clamping members 8. Adjacent the rear axle 5 the side beams 3 are connected by means of a cross link 9 that is pivoted at its ends to brackets 10 attached to the beams 3 for vertical swinging movement, the link 9 resisting relative lateral movements of the rear ends of the beams 3 but allowing slight relative vertical movements.

The supporting truck is held in alinement with the trailer frame by means of links 11 pivoted at their ends for vertical swinging movements to brackets 12 attached to the trailer frame and brackets 13 attached to one of the side beams 3. The links 9 and 11 and the attachment of the side beams to the front axle 4 serve to maintain the side beams 3 beneath the side bars 1 of the trailer frame and in longitudinal alinement with said bars. The trailer frame is yieldably supported on the truck by means of elongated air springs 14 interposed between the beams 3 and side bars 1. The connections between the truck and the trailer frame holds the front axle 4 with its axis at right angles to the longitudinal center line of both the truck and trailer frame. The rear axle 5, however, is so connected to the truck and trailer frame that it is normally held in a position parallel to the axle 4 in a position such that the rear wheels 7 are in alinement with the front wheels 6, but such connections are yieldable to permit lateral movements of the rear axle with respect to the trailer frame when the rear wheels 7 are subjected to lateral thrusts during travel of the trailer in a curved path.

In order to provide for such lateral movements of the rear axle and to automatically return the axle to its normal position when the vehicle resumes straight line travel, elastic rubber blocks 15 are interposed between the rear ends of the side beams 3 and the axle 5. The rubber blocks 15 are elongated and extend longitudinally beneath the rear ends of the beams 3. The cushioning blocks 15 serve as load supporting cushions and yieldingly resist all relative movements of the side beams and axle. The cushioning blocks 15, however, have their greatest yieldability longitudinally of the axle and laterally with respect to the side beams 3 so that they will permit a substantial lateral movement of the beams 3 and the tractor frame with respect to the axle 5.

For convenience in mounting, the blocks 15 are parts of cushioning units, each consisting of the elastic rubber block 15 and rectangular sheet metal plates 16 and 17 bonded to the top and bottom faces of the block 15. The plates 16 and 17 have marginal portions projecting past the side edges of the block 15 to provide means for conveniently attaching the cushioning unit to the beams 3 and axle 5. The top plate 16 is attached to the flat bottom face 19 at the rear end of a beam 3 by means of bolts 18 and bolts 20 attach the bottom plate 17 to a seating member 21 that is rigidly attached to the rear axle 5 and that has a flat top face 22 extending forwardly and rearwardly of the axle and underlying the bottom face 19 of the side beam.

In order to prevent the distortion of the air springs 14 and cushioning blocks 15 by the longitudinal pull exerted on the tractor frame, suitable draft connections are provided between the truck and the trailer frame. As herein shown, a forwardly tapering draft arm 24 is rigidly attached at its rear end to the axle 5 centrally thereof. The draft arm 24 extends forwardly toward the front axle 4 and has a cylindrical forward end portion 25 that is received in a cylindrical socket member 26 attached to a rigid bracket 27 attached to the trailer frame extending downwardly therefrom. The forward end portion 25 of the draft arm 24 and the socket member 26 are disposed substantially in the longitudinal center of the plane of the trailer frame and supporting truck. The end portion 25 is positioned centrally of the socket 26 and a rubber bushing 28 is interposed between the exterior of the cylindrical end 25 and the interior of the socket 26. This connection permits the draft arm 24 and the attached axle 5 to have turning movements about the axis of the end portion 25 of the arm to permit limited vertical rocking movements of the axle 5 with respect to the trailer frame. The elastic rubber bushing 28 also permits limited universal swinging movements of the arm 24 and attached axle 5 with respect to the axis of the socket member 26, the connection between the draft arm 24 and the bracket 27 causing the axle 5 to swing about a point substantially in the center plane of the vehicle frame and forwardly of the axle 5 when it is moved laterally so that there is a slight angular movement of the axle 5 when it is moved laterally. The forward end of the cylindrical portion 25 of the draft arm engages a disk 29 in the socket 26 which is cushioned by a rubber disk 30 interposed between the disk 29 and a closure plate 31 at the rear end of the cylindrical socket member 26. A bolt 32 extends forwardly from the forward end of the arm 21 through the closure plate 31 and a rubber collar 34 surrounds the bolt 32 and is interposed between the plate 31 and a washer 34 on the bolt. The pull exerted by the tractor frame on the draft arm 24 is cushioned by the rubber collar 33 and the rubber disk 30 cushions forward thrusts of the truck on the trailer frame.

A draft arm 24a which may be identical with the draft arm 24 connects the front axle 4 to the tractor frame forwardly of the axle 4, the draft arms 24 and 24a serving to limit the movements of the truck relative to the tractor frame longitudinally thereof so that the air springs 14 are subjected only to compressive stresses and the cushioning blocks 15 are relieved of thrusts in directions of the travel of the vehicle.

By yieldingly supporting the rear axle 5 for lateral swinging movements when the wheel 7 is subjected to lateral thrusts during travel of the vehicle in a curved path, slippage of the tires with respect to the road surface is reduced, the trailer exerts less tractive resistance while being pulled around a curve and both the trailer frame and truck are relieved of severe racking stresses to which they would otherwise be subjected. Also, the automatic shifting of the rear axle during passage around curves by lessening the stresses on the vehicle frame makes it feasible to space the truck axles and supporting wheels considerably farther apart, as is desirable in order to avoid objectionable concentration of loads on bridges.

It is to be understood that in accordance with the provisions of the patent statutes, variations and modifications of the specific devices herein shown and described may be made without departing from the spirit of the invention.

What I claim is:

1. A trailer vehicle having a frame, a wheeled supporting truck having side beams, a front wheel carrying axle secured to said beams in fixed position with respect thereto, means connecting said truck to said frame for restraining movements thereof longitudinally with respect to said frame and for maintaining said beams in longitudinal alinement with said frame, supporting springs interposed between said frame and said beams, a rear wheel carrying axle supporting the rear ends of said beams, and resilient cushioning means connecting said beams to said rear axle and normally holding said rear axle parallel to said front axle, said cushioning means yieldably resisting movements of said axle relative to said beams in all directions but having its greatest yieldability in horizontal directions transverse to said beams to permit said rear axle to shift laterally with respect to said frame and said truck beams while rounding curves.

2. A trailer vehicle having a frame, a wheeled supporting truck having side beams, a front wheel carrying axle secured to said beams in fixed position with respect thereto, means connecting said truck to said frame for restraining movements thereof longitudinally with respect to said frame and for maintaining said beams in longitudinal alinement with said frame, supporting springs interposed between said frame and said beams, a rear wheel carrying axle supporting the rear ends of said beams, seating members attached to said rear axle and underlying said beams, and resilient cushioning means connecting said beams to said rear axle and permitting movements of the rear axle laterally relative to said beams comprising laterally yieldable rubber blocks interposed between said seating members and the under sides of said beams and attached to said beams and said seating members.

3. A trailer vehicle having a frame, a wheeled supporting truck having side beams, a front wheel carrying axle rigidly attached to said beams and disposed at right angles thereto, means connecting said truck to said frame for restraining movements thereof longitudinally with respect to said frame and for maintaining said beams in longitudinal alinement with said frame, air springs interposed between said frame and said beams, a wheel carrying rear axle underlying the rear ends of said beams, means connecting said rear axle to said frame for universal swinging movements about a point adjacent the longitudinal center line of said truck and intermediate said axles, and resilient cushioning members interposed between said rear axle and said beams for normally holding said rear axle in a position at right angles to said beams, said members being laterally yieldable to permit said rear axle to shift laterally with respect to said truck beams and said frame while rounding curves.

4. A trailer vehicle having a frame, a wheeled supporting truck having side beams, a front wheel carrying axle rigidly attached to said beams and disposed at right angles thereto, means connecting said truck to said frame for restraining movements thereof longitudinally with respect to said frame and for maintaining said beams in longitudinal alinement with said frame, air springs interposed between said frame and said beams, a wheel carrying rear axle underlying the rear ends of said beams, means connecting said rear axle to said frame for universal swinging movements about a point adjacent the longitudinal center line of said truck and intermediate said axles, resilient cushioning means connecting said beams to said rear axle and permitting movements of the rear axle laterally relative to said beams comprising a seating member attached to said rear axle beneath each of said side beams, each seating member having a top face extending forwardly and rearwardly of said axle and an elongated laterally yieldable cushioning block of elastic rubber interposed between the top face of each seating member and the bottom face of the overlying beam, said cushioning blocks extending longitudinally of said beams and being attached to the faces between which they are interposed.

5. A trailer vehicle having a frame, a wheeled supporting truck having side beams, a front wheel carrying axle rigidly attached to said beams and disposed at right angles thereto, means connecting said truck to said frame for relative rocking movements and for maintaining said beams in longitudinal alinement with said frame, air springs interposed between said beams and said frame, a wheel carrying rear axle underlying the rear ends of said beams, a draft arm rigidly attached to said rear axle and extending forwardly therefrom, a member rigidly attached to said frame and extending downwardly therefrom into the space between said beams, a swivel connection between said member and the forward end of said arm that permits turning movements of the arm about an axis extending longitudinally of said arm, said connection being cushioned to permit limited swinging movements of said arm transverse to said axis, and resilient cushioning means connecting said beams to the rear axle and permitting lateral movements of the rear axle relative to the beams comprising a seating member attached to said rear axle beneath each beam and an elastic rubber cushioning block interposed between each seating member and the overlying beam and attached to the seating member and beam.

6. A trailer vehicle having a frame, a wheeled supporting truck having side beams, a front wheel carrying axle rigidly attached to said beams and disposed at right angles thereto, means connecting said truck to said frame for relative rocking movements and for maintaining said beams in longitudinal alinement with said frame, air springs interposed between said beams and said frame, a wheel carrying rear axle underlying the rear ends of said beams, a draft arm rigidly attached to said rear axle and extending forwardly therefrom, a member rigidly attached to said frame and extending downwardly therefrom into the space between said beams, a swivel connection between said member and the forward end of said arm that permits turning movements of the arm about an axis extending longitudinally of said arm, said connection being cushioned to permit limited swinging movements of said arm transverse to said axis, and resilient cushioning means connecting said beams to said rear axle and permitting movements of the rear axle laterally relative to said beams comprising a seating member attached to said rear axle beneath each of said beams, each seating member having a top face extending forwardly and rearwardly of said rear axle and an elongated laterally yieldable elastic rubber cushioning block extending longitudinally of each beam between the under face thereof and the top face of the underlying seating member, said cushioning blocks being attached to said faces.

7. A trailer vehicle supporting truck having a front wheel carrying axle, side beams rigidly attached to said axle, a rear axle underlying the rear ends of said beams and movable laterally with respect thereto, and a cushioning unit interposed between each side beam and said rear axle, each unit comprising a laterally yieldable block of elastic rubber and top and bottom metal plates bonded to the top and bottom faces of said rubber block and having marginal portions extending beyond the edges of said block, said marginal portions being attached to said beam and to said axle, respectively.

8. A trailer vehicle supporting truck having a front wheel carrying axle, side beams rigidly attached to said axle, a rear axle underlying the rear ends of said beams and movable laterally with respect thereto, two seating members attached to said rear axle and having top seating faces extending forwardly and rearwardly of the axle beneath said beams, and a cushioning unit interposed between each seating member and the side beam overlying it, each unit comprising an elongated laterally yieldable elastic rubber block and attaching plates bonded to the top and bottom faces of said block and having marginal portions extending beyond the edges of said block, said blocks being disposed beneath said beams and extending longitudinally thereof and said marginal portions of said plates being attached to said beams and said seating members, respectively.

9. The combination with a trailer frame, of a supporting truck comprising a pair of side beams beneath said frame and extending longitudinally thereof, a transverse wheel carrying axle attached to said side beams adjacent one end thereof, a second wheel carrying axle spaced from the first and underlying said beams, means connecting said second axle to said trailer frame for relative lateral movements with respect thereto, means connecting said second axle to said side beams for substantial shifting movements laterally in either direction from its normal position with respect to said side beams when subjected to lateral thrusts in rounding curves which comprises a seating member rigidly attached to said second axle beneath each of the side beams and a laterally yieldable rubber cushioning block interposed between each seating member and the overlying beam and attached to the seating member and overlying beam, means connecting said trailer frame and said side beams for restricting lateral movements of said beams with respect to said frame, and supporting springs interposed between said truck and said trailer frame.

References Cited in the file of this patent

UNITED STATES PATENTS

| | | |
|---|---|---|
| 2,238,002 | Pointer | Apr. 8, 1941 |
| 2,409,507 | Mettetal | Oct. 15, 1946 |
| 2,493,025 | Pointer | Jan. 3, 1950 |
| 2,510,172 | Double et al. | June 6, 1950 |
| 2,742,301 | Pointer | Apr. 17, 1956 |

OTHER REFERENCES

"Homan Tandem Bulletin" No. HTA-1, received June 22, 1954.

SAE Journal, "Air Spring Suspension," July 1954, pp. 40, 45, 46.